United States Patent Office 3,335,358
Patented Aug. 8, 1967

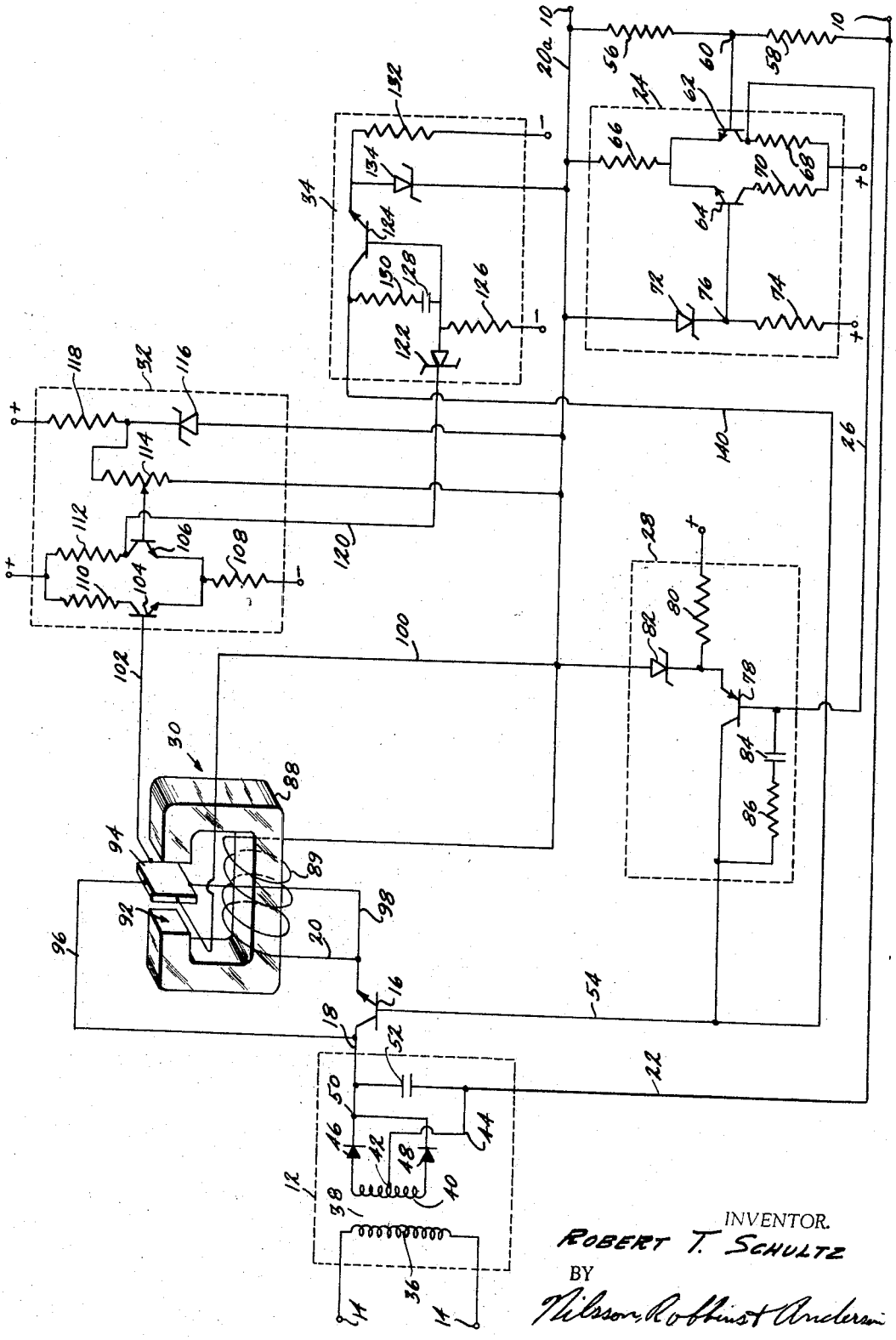

3,335,358
REGULATED POWER SUPPLY WITH CURRENT OVERLOAD PROTECTION USING MAGNETIC FIELD RESPONSIVE ERROR SIGNAL PRODUCING MEANS
Robert T. Schultz, 1250 N. Tressy Ave., Glendora, Calif. 91740
Filed Apr. 6, 1964, Ser. No. 357,633
7 Claims. (Cl. 323—9)

The present invention relates to an electrical power supply that provides an output which is regulated to be constant in one mode of operation; however, which during another mode of operation is controlled by the degree to which energy would otherwise be dissipated to accomplish the regulated output.

Electrical power supplies with a regulated or somewhat fixed output are used in a wide range of electrical apparatus. Conventionally, either the voltage or the current is selected as the parameter to be maintained constant, then, a regulating element capable of modifying the selected parameter is connected to respond to changes and thereby preserve that parameter relatively constant.

Various control elements have been proposed and used in the past to accomplish regulation, many of which are electrically analogous to a variable resistance. These elements function to control the current flow from the power supply by presenting a variable resistance; however, in such operation, they also dissipate a quantity of energy which varies as the output is preserved relatively constant. Control or regulating elements which have been widely used in prior systems include vacuum tubes and transistors as well as other signal-controlled devices. In general, these control devices are limited in the amount of power they can safely dissipate; however, for various reasons, considerable difficulty has been experienced in protecting such elements from overload. Furthermore, if the control element is protected by a fuse or other circuit breaking structure, the power must be turned back on when, for example, the overload has passed, and still further it may be very undesirable to halt the supply of power to certain electrical systems. Therefore, a need exists for an economical, and effective system for providing regulated output electrical power wherein the control element is protected and yet power is not cut off in case of an overload but continuous to be supplied in a restricted manner until full regulation of the output can be re-established.

In general, the present invention comprises an electrical power supply for use in conjunction with a source of direct current energy, including a control or regulating element for controlling the electrical energy provided by the power supply, the operation of which element is monitored by a circuit that senses the energy dissipated in the regulating element to form a secondary control signal. A Hall effect device may be employed for the purpose of monitoring the power dissipation of the control element. The system further incorporates secondary control means which employs the secondary control signal outside certain limits to dominate control of the regulating element, as for example, when the power dissipation in the regulating element reaches a predetermined level.

An object of the present invention is to provide an improved electrical power supply having a regulated output.

Still another object of the present invention is to provide an improved electrical power supply which may be economically manufactured and effectively used, wherein the output is regulated by a first parameter unless the energy dissipated by the regulating element exceeds a predetermined level, after which the output becomes unregulated but continues to exist in a controlled manner.

Still another object of the present invention is to provide a regulated power supply wherein the output is regulated during normal operation by a first transistor amplifier circuit controlling a regulating element; however, wherein upon the power-dissipation demands on the regulating element exceeding the predetermined level, a second amplifier circuit is provided to control the regulating element, dominating the first amplifying system.

A further object of the present invention is to provide a relatively simple and efficient regulated power supply which may be economically manufactured and which will operate effectively to supply continuous power for long periods of time with a regulating element therein that is protected against overload.

These and other objects and advantages of the present invention will become apparent from a consideration of the following, taken in conjunction with the drawing; wherein:

The single figure is a diagrammatic representation (partly perspective) of a system constructed in accordance with the present invention.

Referring now to the figure, the broad function of the system is to provide power with a regulated voltage across the output terminals 10 to which various loads (not shown) may be connected. Considering the power source, a rectifier circuit 12 receives alternating-current energy from a supply (not shown) connected to the terminals 14, and converts such power into a direct-current form. The direct-current power from the rectifier circuit 12 is controlled by a series-regulating transistor 16 so that the current flowing from the rectifier circuit 12 passes through a conductor 18, the transistor 16, a conductor 20 and then to one of the output terminals 10. The other output conductor 22 from the rectifier circuit 12 is connected directly to the other output terminal 10. Regulation is thus accomplished by controlling the transistor 16.

In the development of a regulation control signal, the output at the terminals 10 is sensed by a differential amplifier circuit 24 to provide a signal that is passed through a conductor 26 to an amplifier 28, the output of which provides base current to control the regulating transistor 16. In one mode of operation, these components represent the major operating circuit. However, if the energy dissipated by the series regulating transistor 16 reaches a predetermined power level, a sensing unit 30 (indicated at upper left) provides a signal that causes a differential amplifier 32 to provide an output signal to an amplifier 34 which consumes base current normally provided for the series control transistor with the result that control of the transistor 16 is dominated by the amplifier 34. As a result, the system of the present invention operates somewhat as a regulated output power supply until the power consumed by the regulating element reaches a predetermined level, at which time control of the output becomes dominated by a signal indicative of the power dissipated in the series control element.

Considering the system now in greater detail, the input terminals 14 to the rectifier circuit 12 are connected across a primary winding 36 of a transformer 38, the secondary winding 40 of which provides power for rectification. The secondary winding 40 has a center tap 42 which is connected to a reference potential conductor 44 that is in turn connected to the output conductor 22. The end terminals of the secondary winding 40 are connected through diodes 46 and 48 respectively to a junction point 50. In the operation of the rectifier circuit 12, as is somewhat conventional, alternate half cycles of current pass through the diodes 46 and 48 to provide a full-wave rectified voltage at the junction point 50 which voltage is filtered by a smoothing capacitor 52 connected from the junction point 50 to the reference-potential conductor 44. Direct-current power is thus provided between the output bus or conductor 18, and the reference-level conductor 22.

The current passing from the rectifier circuit 12 through the conductor 18 is applied to the collector electrode of the transistor 16 to flow from the emitter electrode to the output bus or conductor 20 which is serially connected with the output bus 20a connected to one of the terminals 10.

The base control current for the transistor 16 is received through a conductor 54 from the amplifier 28. The amplifier 28 is controlled by a differential amplifier 24 in accordance with the output of the system appearing across the terminals 10, as will now be considered in detail.

A voltage divider including serially-connected resistors 56 and 58 is connected across the terminals 10 with the junction point 60 between the resistors connected to the base electrode of a transistor 62 which is connected in a differential amplifier configuration with another similar transistor 64. The emitter electrodes of the transistors 62 and 64 are connected through a resistor 66 to the output bus 20a, while the collector electrodes are connected respectively through resistors 68 and 70 to a source of positive potential. The base electrode of the transistor 64 is connected to a source of reference potential which includes a Zener diode 72 serially connected with a resistor 74, connected from the bus 20a to a source of positive potential. The actual connection of the base electrode of transistor 64 is made at a junction point 76 between the diode 72 and the resistor 74.

In operation, the differential amplifier 24 receives a reference signal from the junction point 76 which controls the transistor 64. A test signal representative of the actual output is received at the base of the transistor 62 from the junction point 60 for comparison with the reference signal. The difference between these two signals is developed as a control or correction signal at the collector electrode of the transistor 62 and applied through a conductor 26 to the amplifier 28, which in turn controls the regulating transistor 16.

The input to the amplifier 28 is applied to the base electrode of a transistor 78, the emitter electrode of which is connected through a resistor 80 to a source of positive potential, along with, a connection through a Zener diode 82 to the output bus 20a. The transistor 78 is a PNP type transistor, that is, having a current mode as indicated in the figure by the conventional symbol. The base electrode of the transistor 78 is connected through a series circuit including a capacitor 84 and a resistor 86 to the collector electrode of the transistor.

The operation of the amplifier circuit 28 is somewhat conventional, with the input signal from the differential amplifier 24, which appears in the conductor 26, serving to control the current flowing from the collector electrode of the transistor 78 to provide base current for the series control transistor 16. Therefore, during what may be considered normal operation of the system, when the energy dissipated by the transistor 16 is less than a predetermined level, the differential amplifier circuit 24 serves to provide a signal that is applied through the amplifier 28 to regulate the flow of current through the transistor 16, with the resulting regulated output.

The power dissipation in the transistor 16 is sensed by the unit 30 which includes a magnetic core 88 carrying a coil 89 which provides the serial connection between the conductor 20 and the bus 20a. The core 88 has a non-magnetic air gap indicated at 92 which contains a semiconductor device responsive to the Hall effect. The device 94 may comprise high mobility indium arsenide material as well known in the prior art, to provide an output signal which varies as the product of two input signals, one in the form of magnetic field density and the other in the form of electrical current. Structures of this type are well known in the prior art and are discussed at length in the book "Semiconductor Devices" by Shive, published by D. Van Nostrand in 1959, beginning on page 26.

The device 94 receives a magnetic field signal from the core 88 that is indicative of output current. The other input signal to the structure 30 results from the device 94 being connected across the transistor 16 from collector to emitter by conductors 96 and 98. Thus, the magnetism provided by the core 88 is a manifestation of the current flowing through the transistor 16 (it is created by current flowing through the coil 89) and the signal applied to device 94 by the conductors 96 and 98 is representative of the voltage across the transistor 16. Therefore, in accordance with the well known operating characteristics of the device 94, the output signal developed between conductors 100 and 102 is representative of the power dissipated by the transistor 16. That output signal is applied through the conductor 102 to the differential amplifier 32, the output of which functions as a secondary control for the transistor 16 through the amplifier 34.

The differential amplifier 32 is generally similar to the previously described differential amplifier 24. The emitters of the transistors 104 and 106 are connected to a single resistor 108 which is in turn connected to a source of negative potential. The collector electrodes of the transistors 104 and 106 are then connected respectively through resistors 110 and 112 to a source of positive potential. The input at the base electrode of the transistor 104 is the power-dissipation signal in the conductor 102 and the input to the base electrode transistor 106 is from a potentiometer 114 which is connected across a source of constant voltage in the form of a Zener diode 116. The diode 116 is connected through a resistor 118 to a source of positive potential.

In accordance with well known differential amplifier operation, the difference between the input signal to the transistor 104 and that applied to the transistor 106 is manifest at the collector electrode of the transistor 106 from which an output signal is applied through a conductor 120 to the amplifier 34. The conductor 120 is coupled through a Zener diode 122 in the amplifier 34 to the base of a transistor 124, which electrode is also connected through a resistor 126 to a source of negative potential. The base electrode of the transistor 124 is also connected through a series circuit, including a capacitor 128 and a resistor 130, to the collector electrode of the transistor 124. The emitter electrode of the transistor 124 is connected through a resistor 132 to a source of negative potential, and through a Zener diode 134 to the output bus 20a. It is to be noted, that the transistor 124 is an NPN transistor, or a transistor having an opposite current mode from the transistor 78 in the amplifier circuit 28, as indicated symbolically in the figure.

The output from the amplifier 34, representative of the power dissipated in the control transistor 16, is applied from the collector electrode of transistor 124, through a conductor 140 to the base electrode of the transistor 16. In the operation of the system, should the power dissipated by the transistor 16 be sensed to exceed a predetermined level, the sensing unit 30 in cooperation with the differential amplifier 32 senses such an occurrence to apply a signal to the transistor 124 in the amplifier 34, turning on the transistor 124. When the transistor 124 is turned on, a portion of the base drive current previously provided through the collector electrode of the transistor 78 to the base of the transistor 16, is passed through the conductor 140 to the transistor 124. Therefore, control of the transistor 16 is now dominated by the current drawn by the amplifier 34, with the further result that the output voltage is controlled by the amplifier 34 which is in turn controlled by the unit 30 serving to sense the power dissipated in the transistor 16. Thus, the system is exceedingly effective to provide a safe power supply which operates in a somewhat conventional manner within normal limits or operates to provide various other forms of controlled output, e.g. constant power; however, which incorporates a secondary control consideration determined by the power dissipated in the regulating element which comes into operation upon a predetermined occurrence to accomplish a varied mode of control.

Another important feature of the present invention resides in the consideration that the serial control device, e.g. transistor 16 is regulated preserving the operation of the system safe even though the load or output control system demands an unsafe operating condition.

Still another important feature of the present invention resides in the use of two amplifiers having opposite current sense transistors, to mutually control a regulating element through a single conductor.

These and other features of the present invention are evident from the embodiment described herein; however, the scope of the invention is not to be limited to this embodiment, but rather is to be defined by the following claims.

What is claimed is:

1. An electrical power supply for use in conjunction with a source of direct current energy, comprising:
   a regulating element for controlling the electrical energy provided by said power supply;
   means for sensing the electrical output of said power supply to provide a first control signal to control said regulating element;
   means connected to receive the current flowing through said regulating element for producing a magnetic field proportional to the electrical energy dissipated by said regulating element;
   a sensing element responsive to said magnetic field, and disposed therein, to produce a second control signal; and
   means operative at a predetermined range of said second control signal, to control said regulating element, to accordingly establish the electrical energy provided by said power supply.

2. An electrical power supply for use in conjunction with a source of direct current energy, comprising:
   a regulating element for controlling the electrical energy provided by said power supply;
   means for sensing the electrical output of said power supply to provide a first control signal to control said regulating element;
   a Hall-effect device for providing a second control signal;
   magnetic means for providing a magnetic field to said device representative of the current passing through said regulating element;
   voltage means for applying a voltage signal to said device representative of the voltage across said regulating element, whereby said device provides a second control signal, representative of the energy dissipated in said regulating element; and
   means operative at a predetermined range of said second control signal, to control said regulating element, to accordingly establish the electrical energy provided by said power supply.

3. An electrical power supply for use in conjunction with a source of direct current energy, comprising:
   a regulating element for controlling the electrical energy provided by said power supply;
   a first amplifier means for providing a first electrical control signal that is related to the output of said electrical power supply;
   means connected to receive the current flowing through said regulating element for producing a magnetic field responsive to said current flow;
   a sensing element responsive to said magnetic field, and disposed therein;
   a second amplifier means connected to said sensing element for providing a second electrical control signal that is related to the energy dissipated by said regulating element; and
   a control amplifier means for controlling said regulating element in accordance with said first electrical control signal when said second control signal is within predetermined limits, and for controlling said regulating element in accordance with said second electrical control signal when said second electrical control signal is outside said predetermined limits.

4. A power supply according to claim 3 wherein said first amplifier means comprises one conduction type transistor and said second amplifier means comprises the other conduction type transistor.

5. An electrical power supply for use in conjunction with a source of direct current energy, comprising:
   a regulating element for controlling the electrical energy provided by said power supply;
   a first amplifier means for providing a first electrical control signal that is related to the output of said electrical power supply;
   a Hall-effect device for providing a second control signal;
   magnetic means for providing a magnetic field to said device representative of the current passing through said regulating element;
   voltage means for applying a voltage signal to said device representative of the voltage across said regulating element, whereby said device provides a second control signal, representative of the energy dissipated in said regulating element; and
   a control amplifier means for controlling said regulating element in accordance with said first electrical control signal when said second control signal is within predetermined limits, and for controlling said regulating element in accordance with said second electrical control signal when said second electrical control signal is outside said predetermined limits.

6. An electrical power supply for use in conjunction with a source of direct current energy, comprising:
   a regulating element for controlling the electrical energy provided by said power supply;
   a first amplifier means for providing a first electrical control signal that is related to the output of said electrical power supply;
   a Hall-effect device for providing a second control signal;
   magnetic means for providing a magnetic field to said device representative of the current passing through said regulating element;
   voltage means for applying a voltage signal to said devise representative of the voltage across said regulating element, whereby said device provides an output representative of the energy dissipated in said regulating element;
   a second amplifier means for providing a second control signal from said output; and
   a control amplifier means for controlling said regulating element in accordance with said first electrical control signal when said second control signal is within predetermined limits, and for controlling said regulating element in accordance with said second electrical control signal when said second electrical control signal is outside said predetermined limits.

7. A power supply according to claim 6 wherein said first amplifier means comprises one conduction type transistor and said second amplifier means comprises the other conduction type transistor.

References Cited

UNITED STATES PATENTS

| | | | |
|---|---|---|---|
| 2,996,655 | 8/1961 | Byles | 322—25 |
| 3,105,188 | 9/1963 | Harrison | 323—22 |
| 3,182,246 | 5/1965 | Lloyd | 323—22 |
| 3,196,344 | 7/1965 | Walker | 323—22 |

JOHN F. COUCH, *Primary Examiner.*

K. D. MOORE, G. GOLDBERG, *Assistant Examiners.*